United States Patent [19]

Larsen

[11] 4,016,671

[45] Apr. 12, 1977

[54] FISHING LURE

[76] Inventor: Paul F. Larsen, 1025 Sitka Court, Loveland, Colo. 80537

[22] Filed: Dec. 18, 1975

[21] Appl. No.: 642,020

[52] U.S. Cl. .............................. 43/42.17; 43/42.19; 43/42.5; 43/43.13
[51] Int. Cl.² ...................................... A01K 85/00
[58] Field of Search ............... 43/42.51, 42.5, 42.2, 43/43.15, 43.13, 42.11, 42.7, 42.14, 42.52, 42.15–42.19

[56] References Cited

UNITED STATES PATENTS

| 716,451 | 12/1902 | Mantz | 43/42.17 |
| 2,856,723 | 10/1958 | Bruington | 43/43.13 |
| 2,877,592 | 3/1959 | Basgall | 43/43.13 |

FOREIGN PATENTS OR APPLICATIONS

| 481,909 | 6/1953 | Italy | 43/42.11 |

Primary Examiner—Russell R. Kinsey
Assistant Examiner—Peter K. Skiff
Attorney, Agent, or Firm—Hugh H. Drake

[57] ABSTRACT

A fishing lure has an elongated shaft with a loop at one end to connect a fishhook and a loop at the other for securing a line. Axially received on the shaft is a cylindrical body and a swivel ball on the side of the body toward the line-coupling loop. A generally spoon-shaped blade has an aperture located near its head end portion and the shaft is received within the aperture to position the blade between the swivel ball and the line coupling with the cavity of the spoon facing the shaft. The head end portion of the blade is scoop shaped, in reverse, of the spoon shape of the blade. That scoop causes the tail end portion of the blade to tilt outwardly from the shaft when the lure is drawn forwardly through water. The tail end portion of the blade includes a region which is bent or flared outwardly from the shaft in one side of the tail portion, defining a crease oriented at a slant to the longitudinal axis of the blade. As a result, the blade exhibits a propeller or spinning action when the lure is so drawn through the water.

9 Claims, 11 Drawing Figures

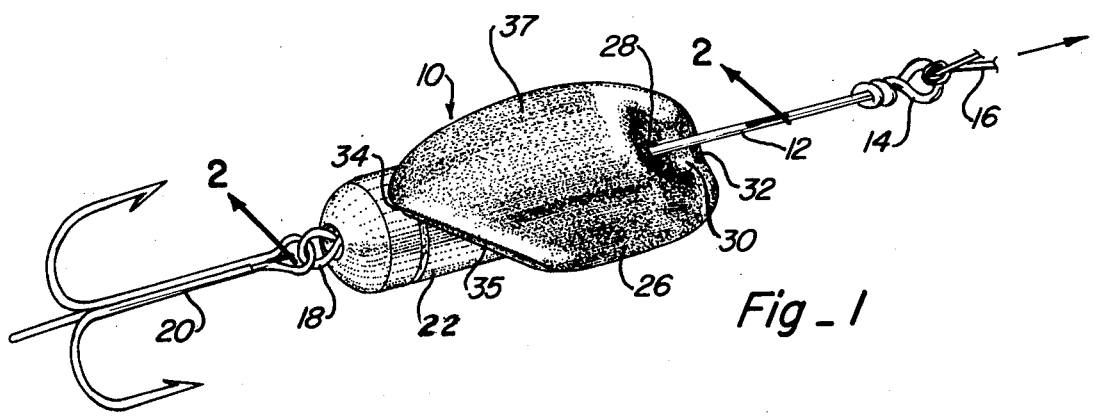
Fig_1
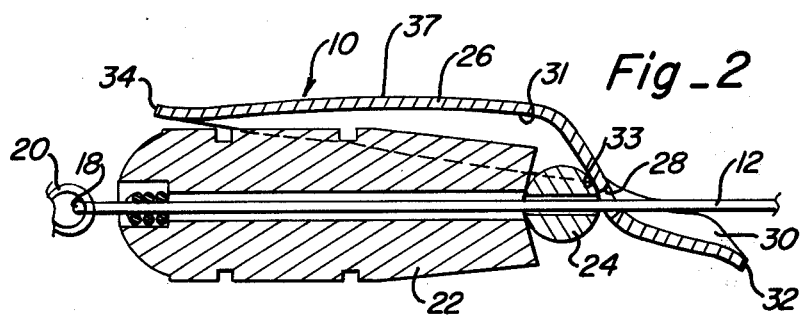
Fig_2
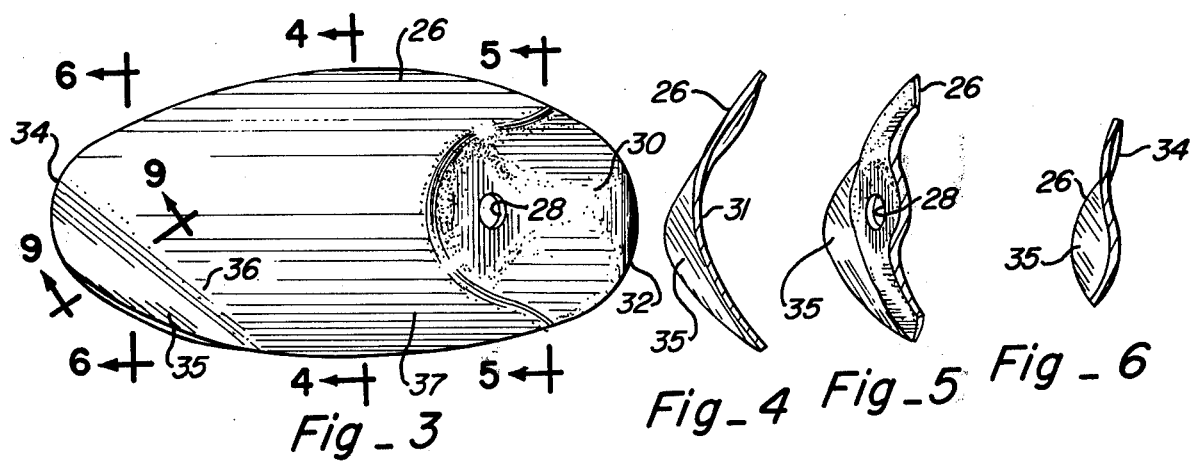
Fig_3  Fig_4  Fig_5  Fig_6
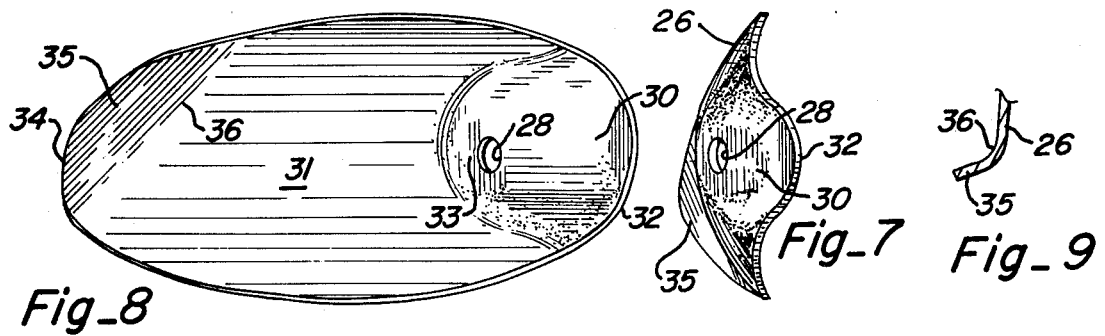
Fig_8  Fig_7  Fig_9

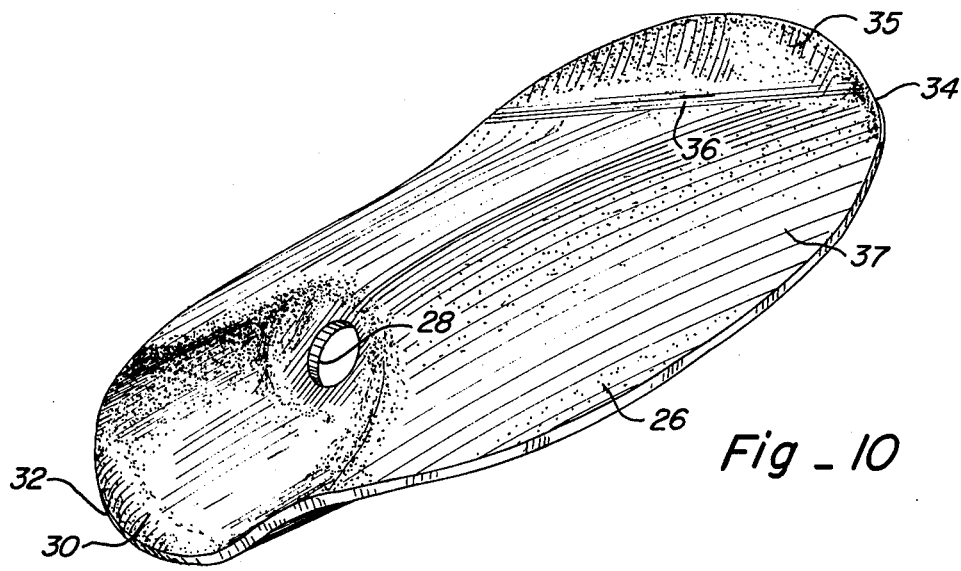
Fig _ 10
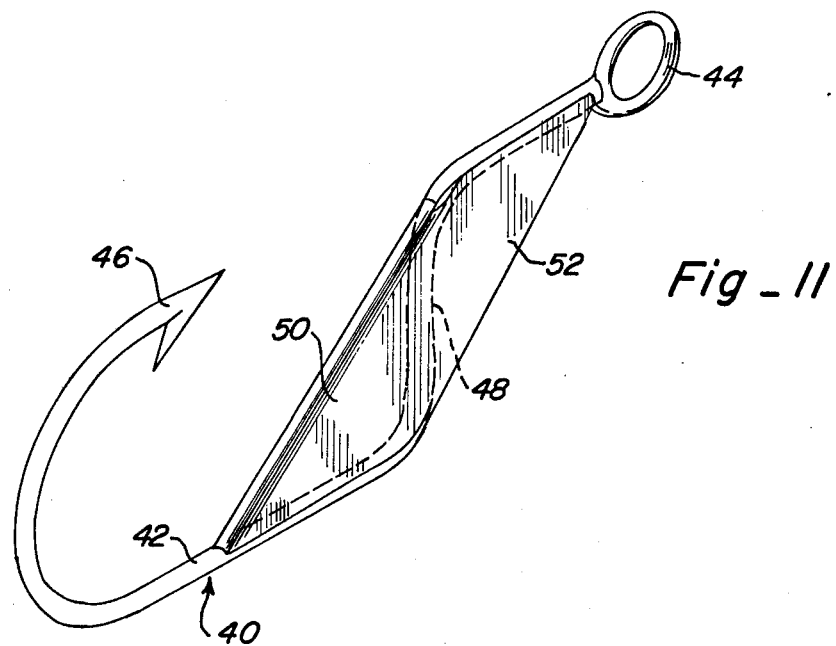
Fig _ 11

FISHING LURE

The present invention pertains for fishing lures. More particularly, it relates to a fishing lure generally of the spinning type.

Of course, a very wide variety of artificial fishing lures are known. One general type is rather commonly called a "spinner" because at least one part of the device is so formed as to spin around a longitudinal axis aligned with the towing leader or line. One related type of spinner is often referred to be the designation "spoon". This is because it is at least generally spoon shaped, as a result of which it tends to spin about a longitudinal axis and perhaps also sort of wobble as drawn through the water.

The end of the development of all such lures is the catching of fish. Sometimes, a particular lure will find decided success when used by a variety of fishermen. In other cases, it will at least appear that a particular lure successful in usage by one individual fisherman will not prove to be successful when used by another individual fisherman having at least a similar degree of experience and apparent skill. Moreover, a lure found by a given individual to be successful on one occasion may, for some reason, not prove to be successful on another. One result of this is that most fishermem end up with a varied collection of different types of artificial lures for use under varying conditions and on different occasions.

Many spinning-type lures, and particularly those of the spoon-type mentioned above, function only when pulled rather rapidly through the water. That requirement may result in the lure having to be pulled too fast to achieve best success. It also tends to make it difficult to fish the lure in a downstream direction, while that direction of approach is normally preferable because the fish themselves usually await for food by positioning themselves with their heads in an upstream direction. Attempting to cause such lures to move downstream with the current often reduces the relative speed between the lure and the water so much that the spinning function ceases to occur.

It is, accordingly, a general object of the present invention to provide a new and improved fishing lure.

Another object of the present invention is to provide a new and improved fishing lure of the spinning type which is capable of maintaining its spinning function even when traveling at very low speed relative to the speed of flow of the water.

A further object of the present invention is to provide a new and improved spinning-type fishing lure that enables the catching of fish under a variety of different stream conditions.

A fishing lure constructed in accordance with the present invention includes an elongated shaft. Defined at one end of that shaft is connecting means for securing a fish hook; coupling means is defined at the other end of the shaft for securing the line. Disposed on the shaft between the connecting and coupling means is a bearing. A generally spoon-shaped blade has an aperture located near the head end portion thereof and in which the shaft is received to position the blade between the bearing and the coupling means with the cavity of the spoon facing the shaft. The head end portion is scoop shaped, away from the shaft in reverse of the general spoon shape of the blade, to cause the tail end of the blade to tilt outwardly from the shaft when the lure is drawn forwardly through the water. The shape of the blade causes it to revolve about the shaft when the lure is so drawn through the water.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIG. 1 is a perspective view of a fishing lure;

FIG. 2 is a fragmentary cross-sectional view taken along the line 2—2 in FIG. 1;

FIG. 3 is a top plan veiw of a principal component of the lure shown in FIG. 2;

FIG. 4 is a cross-sectional view taken along the line 4—4 in FIG. 3;

FIG. 5 is a cross-sectional view taken along the line 5—5 in FIG. 3;

FIG. 6 is a cross-sectional view taken along the line 6—6 FIG. 3;

FIG. 7 is a right-end elevational view of the component shown in FIG. 3;

FIG. 8 is a bottom plan view of the component shown in FIG. 3;

FIG. 9 is a fragmentary cross-sectional view taken along the line 9—9 in FIG. 3;

FIG. 10 is a perspective view of the component shown in FIG. 3; and

FIG. 11 is a perspective view of a hook structure alternative to that shown in FIG. 1.

A fishing lure 10 has an elongated shaft 12 which, in this case, is formed of a length of piano wire. One end portion is formed into a loop 14 and wound back around upon itself, loop 14 serving as a coupling to which a fishing line (or leader) 16 is secured. At its other end, another loop 18 is similarly formed for the purpose of connecting a fishhook 20.

Slidably received upon shaft 12 is a somewhat elongated cylinderical body 22. Also slidably received on shaft 12 and positioned toward loop 14 from body 22 is a swivel ball 24. Finally, a generally spoon-shaped blade 26 is received, by means of an aperture 28, on shaft 12 and in a position between ball 24 and loop 14. As indicated, aperture 28 is located near the head end portion 30 of blade 26. The latter is oriented so that the cavity or concave side 31 of its spoon shape faces shaft 12 and body 22.

Head end portion 30 is scoop shaped; its concavity is oriented in the reverse of the spoon shape of blade 26. It will be observed that aperture 28 is located near the end of the scoop defined by portion 30 opposite the very head end 32 of the blade. Particularly with reference to FIG. 2, it will also be observed that the forward most marginal portion of the defined scoop, at head end 32 of the blade, is spaced laterally away from shaft 12 in all positions of the blade relative to the shaft. Moreover, and again as shown in FIG. 2 as well as shown in FIG. 5 and 7, the forward most margin is bent away from shaft 12. The distance by which aperture 28 is spaced from head end 32 is such as to cause blade 26 to tilt out operationally when the lure is drawn through the water while positioning the blade so as to rest in balance upon swivel ball 24. More specifically, the pressure of the water upon scoop portion 30 is such, in use, as to cause the blade to tilt out away from shaft 12 at an angle of 40–45°. At that tilt angle, the bottom or inner side 33 of scoop portion 30, around aperture 28, rides nicely atop swivel ball 24.

In one side of the tail portion 34 of blade 26 is a region 35 which is bent or flared outwardly and away from shaft 12. Thus, region 35 defines a crease 36 which is oriented at a slant to the longitudinal axis of blade 26. Region 35 serves to enhance propeller action of the blade when the lure is drawn through the water. Thus, the blade is caused to spin around the axis defined by shaft 12.

Desirably, blade 26 is formed from a sheet of brass and at least its outer or convex surface 37 is anodized and antiqued. That is, the surface is lightly brushed during the anodizing so as to provide the appearance of an antique finish. That approach provides a surface which tends to be dull in appearance and exhibits a color tending toward olive. Body 22 and swivel ball 24 likewise may be formed of brass. A shiney brass color for body 22 has been found to be particularly effective in catching various fish such as trout, and it has been particularly effective in catching German Brown trout. A sliver color for body 22 also is contemplated.

As shown in FIG. 1, hook 20 is of a known type having three spearate barbed hook portions symmetrically displaced around the general longitudinal axis of its own shank. That form of hook has been found to be quite effective, the three-sided shape acting as a keel that tends against revolution of the hook structure around the elongated axis of the entire lure. A simple, single hook may tend to so rotate undesirably. Nevertheless, some fisherman may prefer to use a single hook. In that case, the hook structure of FIG. 11 may be utilized. As there shown, a hook 40 includes an elongated shank portion 42 with a loop 44 defined at one end for enabling the usual connection of a fishing line. A barbed hook 46 is formed re-entrantly on the other end of shank 42. A portion 48 of shank 42, intermediate loop 44 and hook 46, is laterally offset as shown. Finally, a planar web 50 is disposed across the one corner as described by offset portion 48 and a like planar web 52 is disposed across the corner so defined. As herein contemplated, web portions 50 and 52 are formed of plastic and are created simply by dipping the offset region in a liquid plastic material, pulling it out, and letting the web portions dry and set. In use, webs 50 and 52 serve as a keel to hold the entire assembly of the fishhook in a stable position, thus resisting rotation about the longitudinal axis of the remainder of the lure. It is, of course, possible to form but a single one of web portions 50 and 52, although greater keel effect is achieved by forming an utilizing both.

Significant and substantial success has been achieved in actual usage of the described lure by a variety of fishermen. A leading attribute of the described structure of blade 26 is its capability of continuing to spin even when moved through the water at extremely slow speed. That, in turn, enables the lure to be fished in a downstream direction so as to approach fish in their usual position while awaiting the arrival of food. The exact conformation of body 22 is not believed to be critical; the form of body illustrated is a conventional item.

While particular embodiments of the invention have been shown and described, and others have been mentioned, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A fishing lure comprising:
an elongated shaft;
connecting means defined at one end of said shaft for securing a fish hook;
coupling means defined at the other end of said shaft for securing a line;
bearing means on said shaft between said connecting and coupling means;
and a generally spoon-shaped blade having an aperture located near the head end portion thereof and in which said shaft is received to position said blade between said bearing means and said coupling means with a cavity of said spoon facing said shaft, said head end portion being scooped shaped, in reverse of the generally spoon shape of said blade, to cause the tail end portion of said blade to tilt outwardly from said shaft when said lure is drawn relatively through water, the forwardmost marginal portion of said head end portion being bent away from said shaft, and the shape of said blade including means causing the blade to revolve about said shaft when said lure is so drawn.

2. A lure as defined in claim 1 in which said blade includes a region outwardly bent from said shaft in one side of the tail portion of said blade for enhancing propeller action of said blade when said lure is so drawn, siad region defining a crease oriented at a slant to the longitudinal axis of said blade.

3. A lure as defined in claim 1 in which said aperture is spaced from said head end by distance enabling the tail end of said blade to tilt out operationally while positioning said blade to balance upon said bearing means.

4. A lure as defined in claim 3 in which said aperture is located near the end of the scoop opposite the head end of said blade.

5. A lure as defined in claim 1 in which said bearing means includes a generally cylindrical body ensleeved on said shaft between said connecting means and said blade.

6. A lure as defined in claim 5 in which said bearing means further includes a swivel ball received on said shaft and disposed between said body and said blade.

7. A lure as defined in claim 5 which said body is bright brass in color.

8. A lure as defined in claim 1 which the outer surface of said blade is formed of antiqued anodized brass.

9. A lure as defined in claim 1 which includes a fishhook connected to said one end and having an integral shank laterally offset intermediate its respective ends, and in which the corners formed by such offset are webbed.

* * * * *